United States Patent
Amante et al.

(10) Patent No.: US 12,136,720 B2
(45) Date of Patent: Nov. 5, 2024

(54) BATTERY STRUCTURAL ASSEMBLY

(71) Applicant: Bell Textron Inc., Fort Worth, TX (US)

(72) Inventors: William A. Amante, Grapevine, TX (US); Karl H. Schroeder, Southlake, TX (US); Jessica A. Revere, Haltom City, TX (US)

(73) Assignee: Textron Innovations Inc., Providence, RI (US)

( * ) Notice: Subject to any disclaimer, the term of this patent is extended or adjusted under 35 U.S.C. 154(b) by 341 days.

(21) Appl. No.: 17/172,363

(22) Filed: Feb. 10, 2021

(65) Prior Publication Data

US 2022/0255159 A1 Aug. 11, 2022

(51) Int. Cl.
| | |
|---|---|
| *B64C 1/06* | (2006.01) |
| *F28F 3/12* | (2006.01) |
| *H01M 10/613* | (2014.01) |
| *H01M 10/625* | (2014.01) |
| *H01M 10/6554* | (2014.01) |
| *H01M 10/6556* | (2014.01) |
| *F28D 21/00* | (2006.01) |

(52) U.S. Cl.
CPC ......... *H01M 10/6554* (2015.04); *B64C 1/061* (2013.01); *F28F 3/12* (2013.01); *H01M 10/613* (2015.04); *H01M 10/625* (2015.04); *H01M 10/6556* (2015.04); *F28D 2021/0019* (2013.01); *H01M 2220/20* (2013.01)

(58) Field of Classification Search
CPC .. B64C 1/00; B64C 1/06; B64C 1/061; B64C 1/062; B64C 1/065
See application file for complete search history.

(56) References Cited

U.S. PATENT DOCUMENTS

| | | | | |
|---|---|---|---|---|
| 8,703,319 | B1 * | 4/2014 | Aston | H01M 50/244 429/120 |
| 8,920,594 | B2 * | 12/2014 | Carstensen | B64C 1/06 244/119 |
| 11,267,327 | B2 * | 3/2022 | Matecki | H01M 50/204 |
| 11,728,540 | B2 * | 8/2023 | Amante | H01M 10/6556 429/120 |
| 2002/0162696 | A1 * | 11/2002 | Maus | H01M 50/244 180/68.5 |
| 2005/0180104 | A1 * | 8/2005 | Olesen | H01L 23/473 361/689 |
| 2006/0071124 | A1 * | 4/2006 | Young | B64C 1/06 244/133 |
| 2006/0105236 | A1 | 5/2006 | Zhu | |
| 2006/0237166 | A1 | 10/2006 | Otey | |

(Continued)

FOREIGN PATENT DOCUMENTS

| | | | | |
|---|---|---|---|---|
| CN | 102931364 A | * | 2/2013 | ......... H01M 10/613 |
| DE | 102014200989 A1 | * | 7/2015 | ............... F28F 1/22 |

(Continued)

*Primary Examiner* — Joshua J Michener
*Assistant Examiner* — Ryan Andrew Yankey
(74) *Attorney, Agent, or Firm* — Frost Brown Todd LLP

(57) ABSTRACT

An aircraft includes a fuselage and an airframe supporting the fuselage. The airframe includes a pair of longitudinally-extending beams. The aircraft further includes a battery assembly including a cold plate secured to the pair of longitudinally-extending beams, and a battery mounted to the cold plate.

18 Claims, 10 Drawing Sheets

(56) References Cited

U.S. PATENT DOCUMENTS

| | | |
|---|---|---|
| 2010/0243346 A1 | 9/2010 | Anderson |
| 2011/0189525 A1 | 8/2011 | Palanchon |
| 2011/0206966 A1 | 8/2011 | Schmid |
| 2011/0287287 A1 | 11/2011 | Kang |
| 2012/0028099 A1 | 2/2012 | Aoki |
| 2012/0121946 A1* | 5/2012 | Eckstein ............... B60R 16/04 429/120 |
| 2012/0156543 A1 | 6/2012 | Cicero |
| 2013/0244077 A1 | 9/2013 | Palanchon |
| 2014/0305622 A1 | 10/2014 | Daubitzer |
| 2015/0266387 A1* | 9/2015 | Garfinkel ......... H01M 10/6551 180/65.21 |
| 2017/0018811 A1 | 1/2017 | Bradwell |
| 2017/0047624 A1* | 2/2017 | Gunna ............. H01M 10/6556 |
| 2018/0212222 A1 | 7/2018 | Barton |
| 2018/0304390 A1 | 10/2018 | Hirayama |
| 2019/0237827 A1 | 8/2019 | Ge |
| 2019/0252744 A1* | 8/2019 | Zimmermann ........ B64D 27/24 |
| 2019/0296300 A1* | 9/2019 | Zimmermann ..... H01M 50/242 |
| 2019/0319249 A1 | 10/2019 | Barton et al. |
| 2019/0393571 A1* | 12/2019 | Weicker ............. H01M 50/505 |
| 2020/0006824 A1* | 1/2020 | Lim .................. H01M 10/6556 |
| 2020/0006825 A1* | 1/2020 | Lee .................. H01M 10/6567 |
| 2020/0313260 A1 | 10/2020 | Wang |
| 2022/0077520 A1 | 3/2022 | Donovan |

FOREIGN PATENT DOCUMENTS

| | | | |
|---|---|---|---|
| DE | 102014203644 A1 * | 9/2015 | ......... B60K 11/085 |
| DE | 102015107170 | 11/2016 | |

* cited by examiner

BATTERY STRUCTURAL ASSEMBLY

TECHNICAL FIELD

The present disclosure is directed to a battery structural assembly for mounting a battery to an aircraft.

BACKGROUND OF THE INVENTION

Conventionally powered rotorcraft, such as helicopters and tiltrotors, are driven by a combustion engine mechanically transmitting power to the rotors. In some rotorcraft, the rotor's mechanical drive system is replaced with direct drive electric motor systems. In hybrid rotorcraft designs, a combustion engine may drive a main rotor while a separate electric system is used to drive one or more anti-torque rotors. This approach can be used to improve rotorcraft propulsion systems, for example, to reduce noise, reduce weight, or to improve safety. Both electric and hybrid rotorcraft designs require multiple batteries to be stored on the rotorcraft. Typically, such batteries are stored in the fuselage of the rotorcraft. Due to the size and weight of each battery (e.g., greater than 300 pounds), this may undesirably increase the size of the fuselage, as well as the weight of the rotorcraft and the amount of drag experienced by the rotorcraft during flight operations.

BRIEF SUMMARY OF THE INVENTION

In a first aspect, the present disclosure is directed to an aircraft including (a) a fuselage; (b) an airframe supporting the fuselage, wherein the airframe includes a pair of longitudinally-extending beams; and (c) a battery assembly including: (i) a cold plate secured to the pair of longitudinally-extending beams, and (ii) a battery mounted to the cold plate. In some embodiments, the cold plate includes (a) a planar member; and (b) at least one fluid channel positioned below a lower side of the planar member and configured to receive a cooling fluid, wherein the battery is mounted to an upper side of the planar member for transferring heat from the battery to the cooling fluid through the planar member. In this regard, the planar member may include a main structural web. In addition or alternatively, the cold plate may further include a plurality of stiffeners positioned on the upper side of the planar member. For example, the plurality of stiffeners may be spaced apart from each other to define respective compartments for receiving corresponding battery packs of the battery. In some embodiments, the at least one fluid channel is defined by a tube. The cold plate may further include an enclosure panel operatively coupled to the main structural web. In this regard, the enclosure panel may be positioned below the at least one fluid channel. For example, the enclosure panel may define an outer structural skin of the aircraft.

In some embodiments, the battery includes a fitting having a plurality of apertures configured to receive corresponding battery packs. In this regard, the fitting may be configured to clamp the battery packs against the cold plate. In some embodiments, the cold plate further includes at least one attachment flange configured to couple to the pair of longitudinally-extending beams. In addition or alternatively, the battery may have a battery weight, wherein the cold plate is configured to support the battery weight. In some embodiments, the pair of longitudinally-extending beams includes a pair of upper roof beams. In other embodiments, the pair of longitudinally-extending beams includes a pair of lower keel beams.

In a second aspect, the present disclosure is directed to a battery assembly for an aircraft. The battery assembly includes (a) a cold plate including: (i) a planar member, and (ii) at least one fluid channel positioned below a lower side of the planar member and configured to receive a cooling fluid; and (b) a battery mounted to an upper side of the planar member for transferring heat from the battery to the cooling fluid through the planar member. In some embodiments, the cold plate further includes an attachment flange configured to couple to a pair of beams of the aircraft. In addition or alternatively, the battery may have a battery weight, wherein the cold plate is configured to support the battery weight.

In a third aspect, the present disclosure is directed to a method of manufacturing a battery for an aircraft. The method includes (a) positioning at least one fluid channel below a main structural web; and (b) operatively coupling a battery to the main structural web such that the battery is positioned above the at least one fluid channel. In some embodiments, the method further includes securing the main structural web to a pair of beams of the aircraft.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
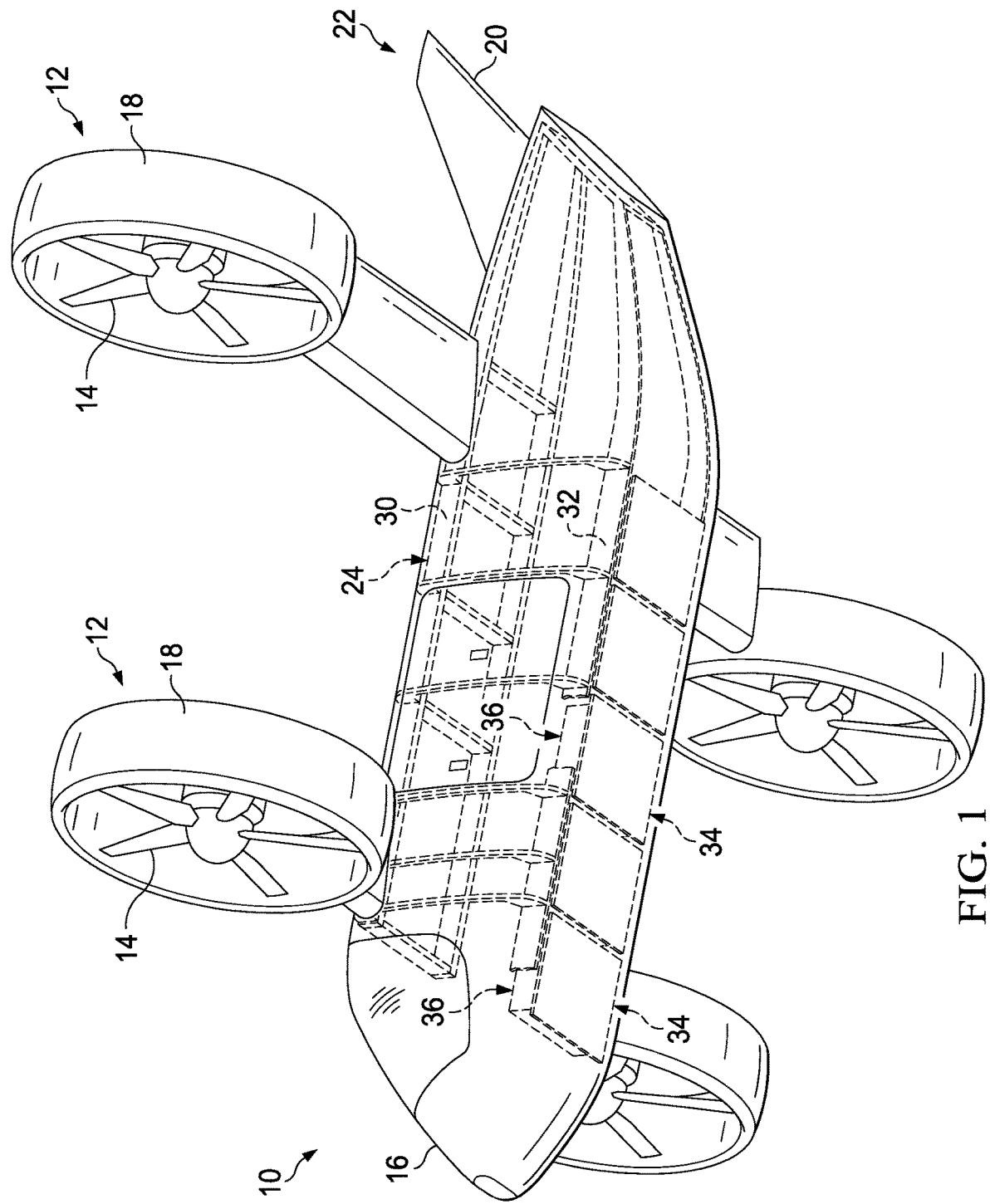
FIG. 1 is a perspective view of an exemplary rotorcraft having at least one battery assembly secured to the lower keel beams of the helicopter.

Referring now to FIG. 1, an exemplary electric aircraft in the form of a rotorcraft (10) includes a plurality of rotor systems (12) each having a plurality of rotor blades (14) mounted within respective ducts (18). The pitch of each rotor blade (14) may be managed or adjusted to selectively control direction, thrust, and lift of rotorcraft (10). As shown, rotorcraft (10) includes a fuselage (16), a tail structure (20) positioned at a tail end (22) of rotorcraft (10), and an airframe (24) which supports fuselage (16). Torque is supplied to rotor systems (12) using at least one motor. Rotorcraft (10) may include a variety of fairing and/or cowling assemblies (not shown) configured to cover or protect components of rotorcraft (10) and to reduce aerodynamic drag. Rotor system (12) is coupled to airframe (24) and, during operating, transmits vibrations to airframe (24).

Airframe (24) of the present version includes a pair of laterally-opposed, longitudinally-extending upper roof beams (30), a pair of laterally-opposed, longitudinally extending lower keel beams (32), and a plurality of battery chasses in the form of cold plates (34) extending between and secured to lower keel beams (32). In some versions, cold plates (34) may also be secured to each other. In any event, each cold plate (34) supports a respective battery (36), thereby collectively defining respective battery assemblies (38). While five battery assemblies (38) are shown in the present version, it will be appreciated that any suitable number of battery assemblies (38) may be used to provide any desired number of batteries (36). It will also be appreciated that each cold plate (34) may alternatively extend between and be secured to upper roof beams (30).

Figure 2:
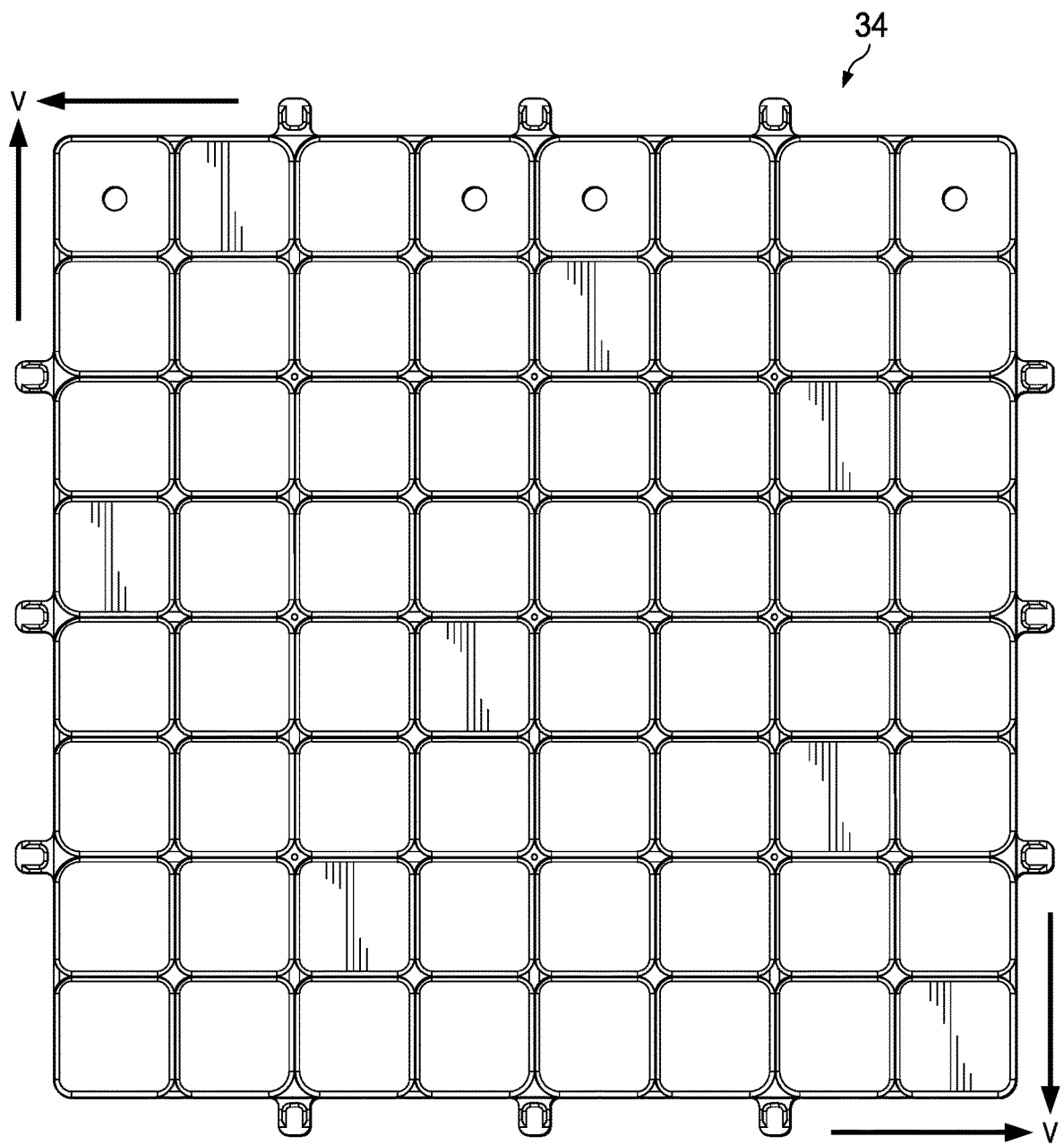
FIG. 2 is a bottom plan view of the battery assembly of FIG. 1, showing the cold plate reacting aircraft shear loads.

Referring now to FIG. 2, each cold plate (34) may be configured to react aircraft loads in a manner similar to structural panels of rotorcraft (10) in any suitable area of rotorcraft (10) in which each cold plate (34) may be mounted, such as in the floor, roof panels, belly skins, or tail of rotorcraft (10). As shown in FIG. 2, such aircraft loads reacted by each cold plate (34) may include shear loads (V). It will be appreciated that aircraft loads reacted by each cold plate (34) may also include bending loads.

Figure 3:
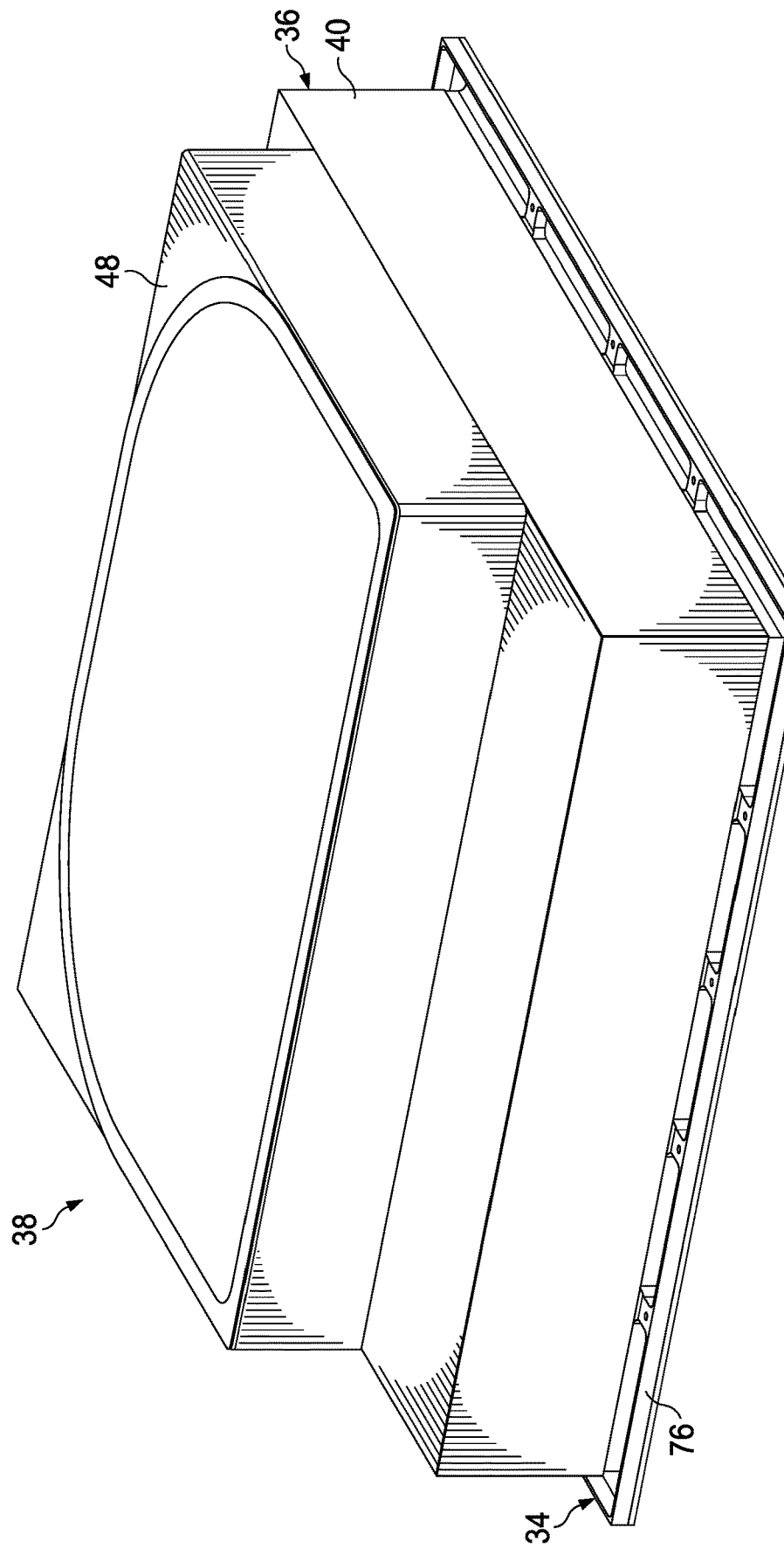
FIG. 3 is a top perspective view of the battery assembly of FIG. 1.

Referring now to FIG. 3, each battery (36) includes a respective battery case (40) for containing a plurality of battery packs (not shown). Batteries (36) may be used as a primary power source for propelling rotorcraft (10). For example, batteries (36) may include one or more of a traction battery, an electric-vehicle battery, a secondary cell battery, a Lithium-ion, Lithium polymer battery, and/or any subsets or combinations thereof. Other types of batteries or battery technologies are compatible with the present disclosure. In any event, each battery assembly (38) of the present version further includes a battery management system housing (48) secured to battery (36) for containing monitoring equipment (not shown) for monitoring battery (36). In some versions, such monitoring equipment may be integrated directly into battery (36), such that battery management system housing (48) may be omitted.

Figure 4:
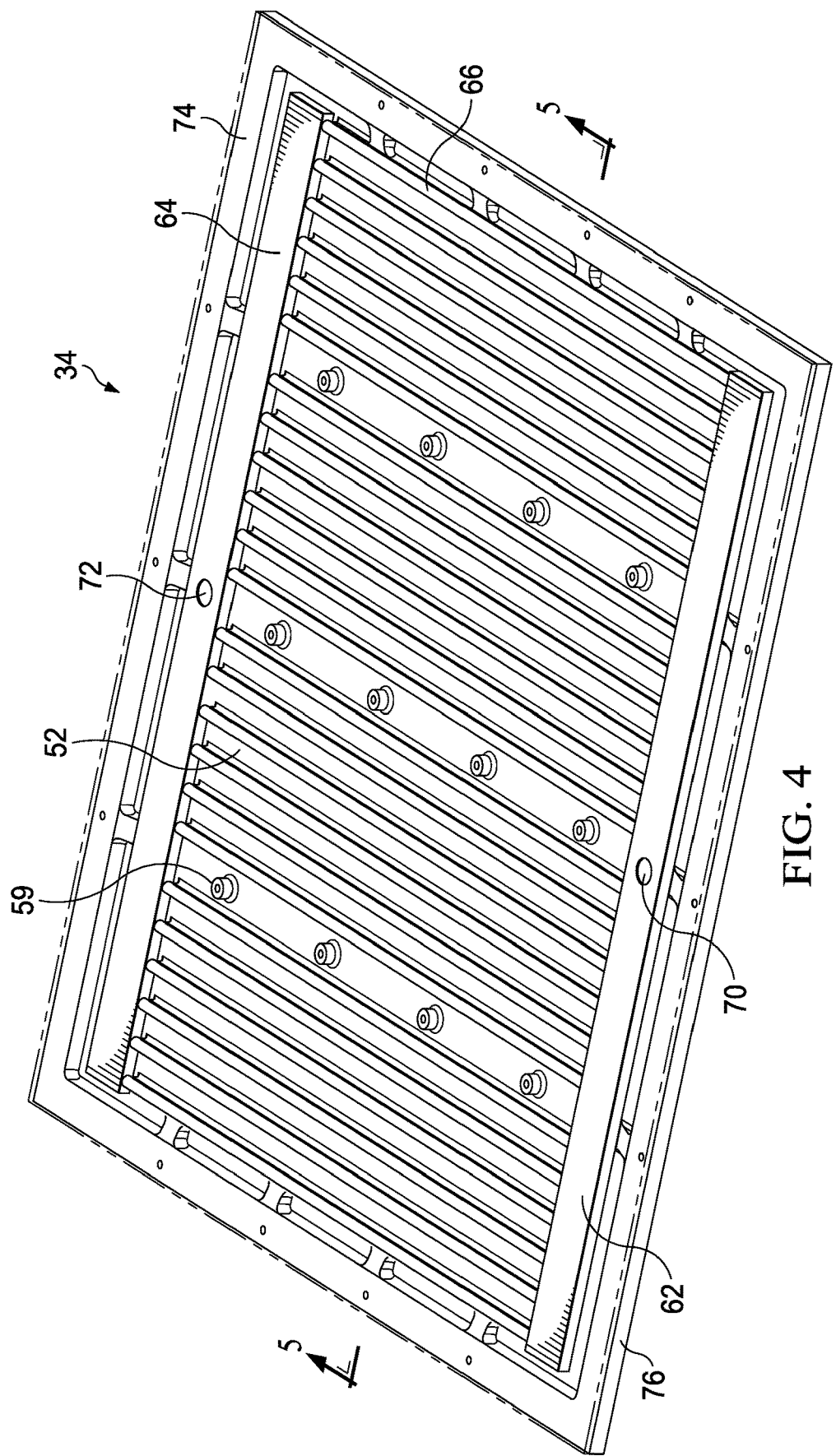
FIG. 4 is a bottom perspective view of the cold plate of the battery assembly of FIG. 1.
Figure 5:
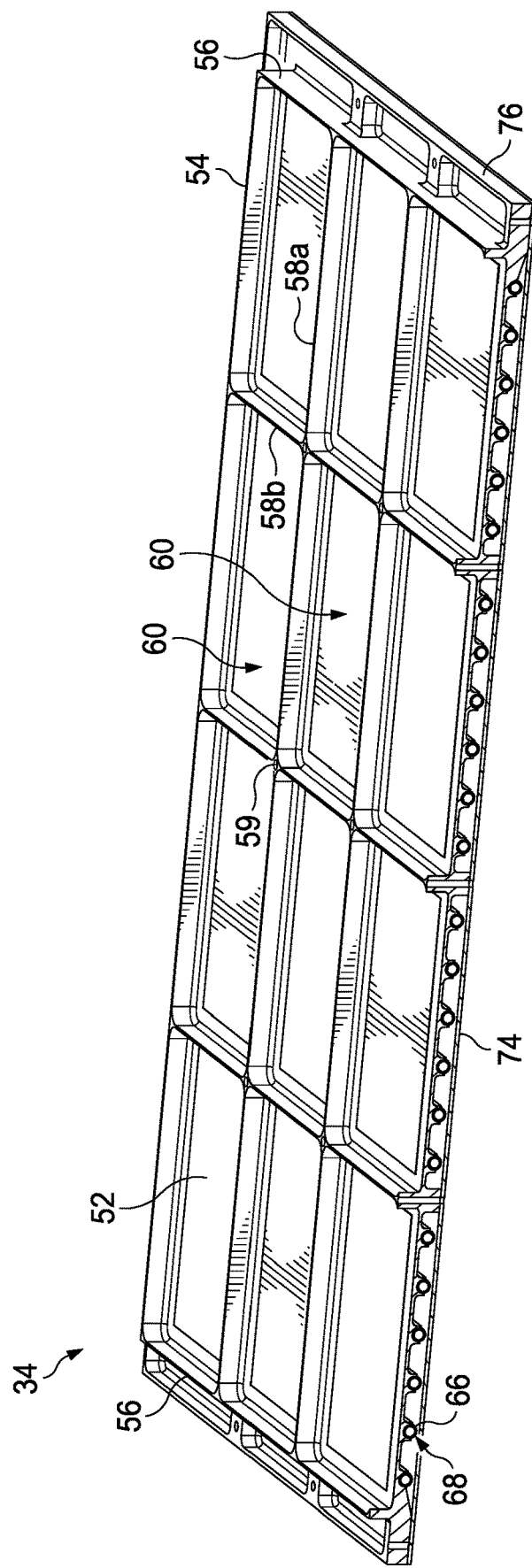
FIG. 5 is a top schematic cross-sectional view of the cold plate of FIG. 4, taken along section line 5-5 in FIG. 4.

Referring now to FIGS. 4 and 5, cold plate (34) of each battery assembly (38) includes a generally horizontal, rectangular main structural web (52), generally vertical sidewalls (54) (one shown) extending upwardly from an upper surface of main structural web (52), and generally vertical end walls (56) extending upwardly from the upper surface of main structural web (52), such that sidewalls (54) and end walls (56) are each generally perpendicular to main structural web (52). As shown, cold plate (34) further includes a plurality of stiffeners in the form of generally vertical ribs including longitudinally-extending ribs (58a) and laterally-extending ribs (58b) extending upwardly from the upper surface of main structural web (52), such that ribs (58a, 58b) are each generally perpendicular to main structural web (52). More particularly, longitudinally-extending ribs (58a) are each generally parallel to sidewalls (54) and generally perpendicular to and terminate at or near end walls (56), and laterally-extending ribs (58b) are each generally parallel to end walls (56) and generally perpendicular to and terminate at or near sidewalls (54). In the example shown, ribs (58a, 58b) are arranged in a grid pattern, such that longitudinally-extending ribs (58a) intersect each laterally-extending rib (58b) and laterally-extending ribs (58b) intersect each longitudinally-extending rib (58a). Cold plate (34) includes a plurality of bores (59) positioned at respective intersections between longitudinally-extending ribs (58a) and laterally-extending ribs (58b), the purpose of which is described below. In some versions, main structural web (52), sidewalls (54), end walls (56), and ribs (58a, 58b) may be integrally formed together as a unitary piece. In addition or alternatively, any one or more of main structural web (52), sidewalls (54), end walls (56), and ribs (58a, 58b) may be constructed of a thermally conductive material, such as metal.

In the example shown, adjacent pairs of longitudinally-extending ribs (58a) are uniformly spaced apart from each other (and laterally-outermost longitudinally-extending ribs (58a) are uniformly spaced apart from sidewalls (54)) at equal intervals, and adjacent pairs of laterally-extending ribs (58b) are uniformly spaced apart from each other (and longitudinally-outermost laterally-extending ribs (58b) are uniformly spaced apart from end walls (56)) at equal intervals to collectively define respective compartments (60) therebetween. Compartments (60) may be arranged in a grid pattern thereby securely receiving at least portions (e.g., bottoms) of respective battery packs to assist with stabilizing the battery packs against movement relative to cold plate (34). In the example shown, cold plate (34) includes a total of 20 compartments (60) for securely receiving 20 battery packs. However, any suitable number of compartments (60) may be used to securely receive any corresponding number of battery packs. Thus, ribs (58a, 58b) may be configured to both provide structural rigidity to cold plate (34), and to assist with securing battery (36) to cold plate (34).

In the present version, cold plate (34) further includes fluid intake and exhaust manifolds (62, 64) fixed to a lower recessed surface of main structural web (52) at or near respective lateral sides of main structural web (52) and a plurality of laterally-extending tubes (66) extending along the lower recessed surface of main structural web (52) between manifolds (62, 64), such that manifolds (62, 64) and tubes (66) are on an opposite side of main structural web (52) from ribs (58a, 58b). Tubes (66) may be fixed to the lower recessed surface of main structural web (52) in any suitable manner, such as via swaging. In any event, each tube (66) defines a respective fluid channel (68) in fluid communication with interiors of both manifolds (62, 64).

Thus, tubes (66) may be configured to direct a cooling fluid (e.g., coolant, forced air, etc.) along the respective fluid channels (68) while preventing such cooling fluid from contacting main structural web (52) and/or ribs (58a, 58b).

In this regard, intake manifold (62) includes a fluid inlet port (70) for supplying the cooling fluid to fluid channels (68) from a cooling fluid reservoir (not shown), and exhaust manifold (64) includes a fluid outlet port (72) for discharging the cooling fluid from fluid channels (68) to the cooling fluid reservoir. In some versions, any of fluid channels (68) may be in fluid communication with each other, such as via manifolds (62, 64). For example, alternating ends of fluid channels (68) may be in fluid communication with each other to collectively define a generally serpentine fluid path from inlet port (70) to outlet port (72). In other versions, fluid channels (68) may be isolated from each other to define independent, generally parallel fluid paths from inlet port (70) to outlet port (72). While each fluid channel (68) of the present example is defined by a respective tube (66), fluid channels (68) may be defined by any other suitable structure. For example, each fluid channel (68) may be defined between adjacent pairs of lower ribs (not shown) extending downwardly from main structural web (52).

In the example shown, cold plate (34) further includes a generally horizontal enclosure panel (74) configured to couple to main structural web (52) below the lower recessed surface thereof and also below tubes (66) and fluid channels (68). It will be appreciated that enclosure panel (74) may be either fixedly or removably coupled to main structural web (52). In some versions, enclosure panel (74) may define an outer structural skin of aircraft (10). In some versions, enclosure panel (74) may be constructed of a thermally conductive material, such as metal. In other versions, enclosure panel (74) may be omitted, such as is described below with respect to FIGS. 6-9.

In the present version, cold plate (34) also includes a peripheral attachment flange (76) extending longitudinally and laterally outwardly from main structural web (52) beyond sidewalls (54) and end walls (56). Cold plate (34) may be secured to lower keel beams (32) (or upper roof beams (30)) via a plurality of aerospace fasteners such as pins, screws, rivets or other suitable fastening means extending through bores (78) in attachment flange (76) and into lower keel beams (32) (or upper roof beams (30)) to form airframe (24), such that cold plate (34) may act as a load path for airframe (24). In some versions, cold plates (34) of adjacent battery assemblies (38) may be secured to each other via the respective attachment flanges (76) in a similar manner.

Referring again to FIG. 3, battery (36) is mounted to the upper side of cold plate (34) to form battery assembly (38). More particularly, battery (36) is mounted to ribs (58a, 58b) such that battery (36) is positioned over cold plate (34). Battery (36) may be mounted to ribs (58a, 58b) via aerospace fasteners such as pins, screws, rivets or other suitable fastening means extending through battery case (40) and received by respective bores (59) in ribs (58a, 58b). In addition or alternatively, battery (36) may be mounted to ribs (58a, 58b) via a clamping mechanism (e.g., a C-clamp) configured to clamp battery case (40) against ribs (58a, 58b) and/or main structural web (52). In any event, an outer surface of battery (36) may be in contact or near contact with ribs (58a, 58b) and/or main structural web (52)), to assist with transferring heat from battery (36) to the cooling fluid within cooling channels (68), such as for cooling battery (36) either during or prior to (e.g., "preconditioning" battery (36)) performing a flight operation. While battery (36) of the present version is mounted to the upper side of cold plate (34), battery (36) may alternatively be mounted to the lower side of cold plate (34). In such cases, an outer surface of battery (36) may be in contact or near contact with enclosure panel (74), to assist with transferring heat from battery (36) to the cooling fluid within cooling channels (68).

By utilizing cold plate (34) as a battery chassis and securing cold plate (34) to lower keel beams (32) (or upper roof beams (30)), cold plate (34) may both support the weight of and remove heat from battery (36), thereby eliminating the need for separate supporting structures and cooling systems and thus reducing the weight of rotorcraft (10), at least by comparison to a similar rotorcraft having such separate supporting structures and cooling systems. In this regard, cold plate (34) may be capable of reacting shear and/or bending loads. For example, cold plate (34) may provide a load path for a bending load due to the weight of battery (36) (which may be perpendicular to a plane defined by main structural web (52)), by transferring such load through ribs (58a, 58b), main structural web (52), and attachment flange (76) to lower keel beams (32) (or upper roof beams (30)). In addition or alternatively, cold plate (34) may transfer at least some of such load through enclosure panel (74) and attachment flange (76) to lower keel beams (32) (or upper roof beams (30)), such that main structural web (52) and enclosure panel (74) may cooperate to define a weight efficient structural sandwich member (e.g., with main structural web (52) defining an upper sandwich portion and enclosure panel (74) defining a lower sandwich portion). In some cases, shear loads may be efficiently reacted by enclosure panel (74) and stabilized by main structural web (52) to prevent buckling. By preventing the cooling fluid from contacting various structural components of cold plate (34) such as main structural web (52), ribs (58a, 58b), and/or enclosure panel (74) via tubes (66), any potential corrosion of such structural components by the cooling fluid which might otherwise occur may be avoided. Moreover, positioning battery (36) above tubes (66) and on an opposite side of main structural web (52) from tubes (66) may inhibit any cooling fluid which might leak from tubes (66) from reaching battery (36) and thereby avoid electrical shorts from occurring. Such positioning of battery (36) may also allow battery (36) to be readily accessible for removal, installation, and/or maintenance of battery (36).

Referring now to FIGS. 6-9, an alternative battery chassis in the form of a cold plate (134) supports a battery (136), thereby collectively defining an alternative battery assembly (138) similar to battery assembly (38) except as otherwise described herein. Battery (136) includes a battery fitting (140) for restraining a plurality of battery packs (142). In this regard, battery fitting (140) includes a plurality of apertures (144) arranged in a grid pattern for securely receiving at least portions (e.g., tops) of respective battery packs (142) to assist with stabilizing battery packs (142) against movement relative to fitting (140). In the example shown, battery fitting (140) includes a total of 20 apertures (144) for securely receiving 20 battery packs (142). However, any suitable number of apertures (144) may be used to securely receive any corresponding number of battery packs (142). In any event, battery (136) also includes a plurality of generally vertical enclosure panels (146) configured to couple to fitting (140) about its periphery to thereby surround battery packs (142). It will be appreciated that enclosure panels (146) may be either fixedly or removably coupled to fitting (140). In some versions, enclosure panels (146) may be capable of reacting shear loads. For example, enclosure panels (146) may define structural skins of aircraft (10). As shown, battery assembly (138) of the present version further includes a battery management system housing (148) secured to battery (136) for containing monitoring equipment (not shown) for monitoring battery (136). In some versions, such monitoring equipment may be integrated directly into battery (136), such that battery management system housing (148) may be omitted.

Figure 7:
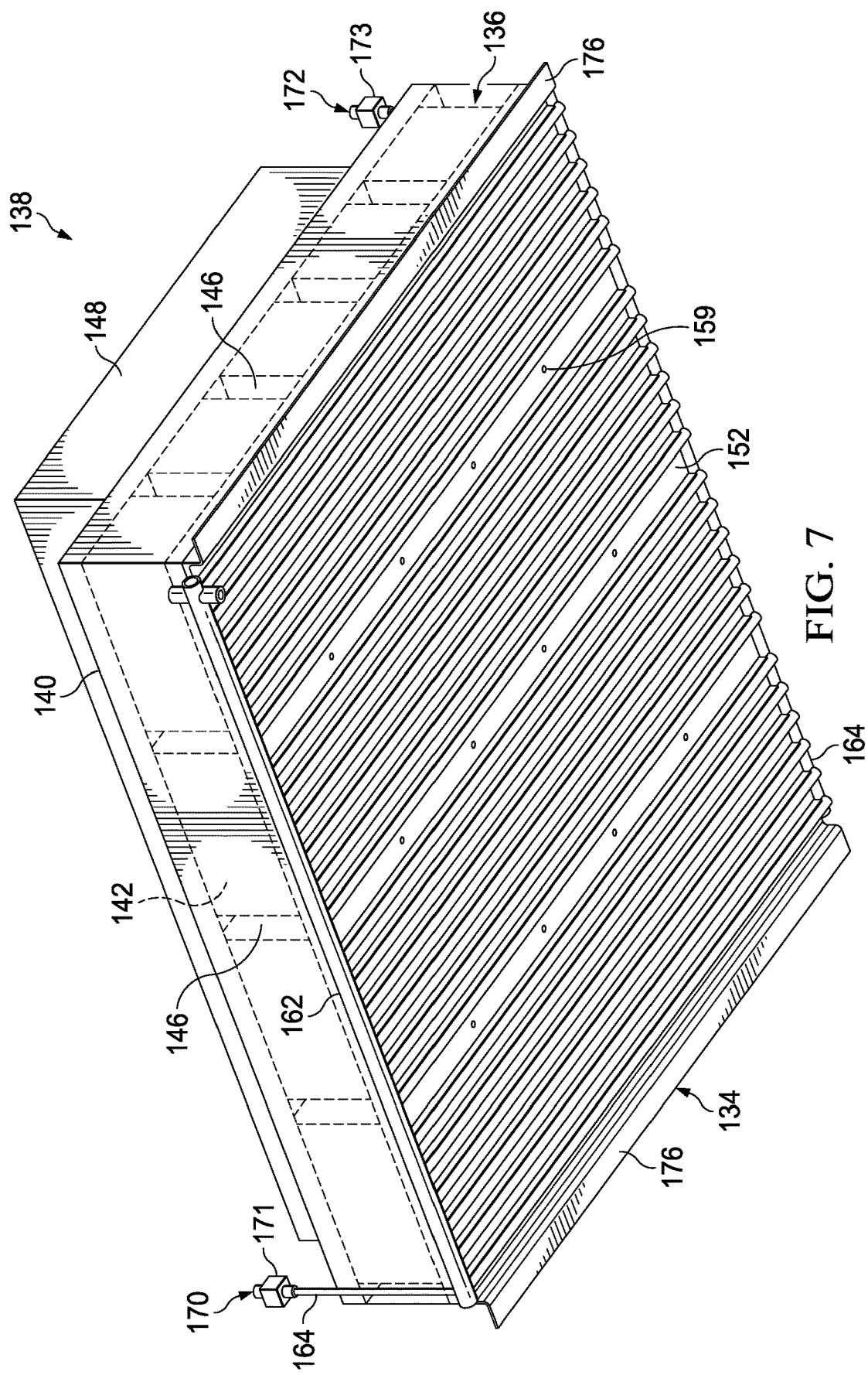
FIG. 7 is a bottom perspective view of the battery assembly of FIG. 6.
Figure 8:
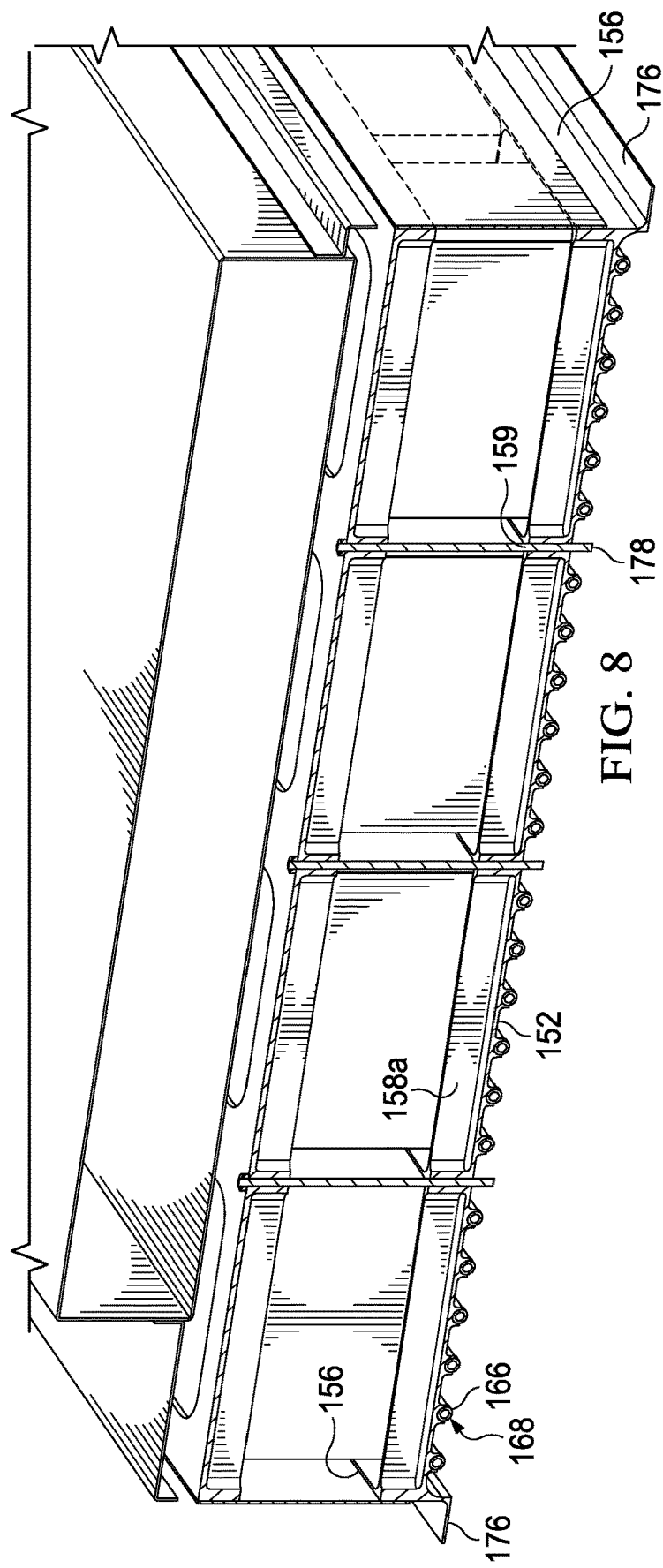
FIG. 8 is a cross-sectional view of the battery assembly of FIG. 6, taken along section line 8-8 in FIG. 6.
Figure 9:
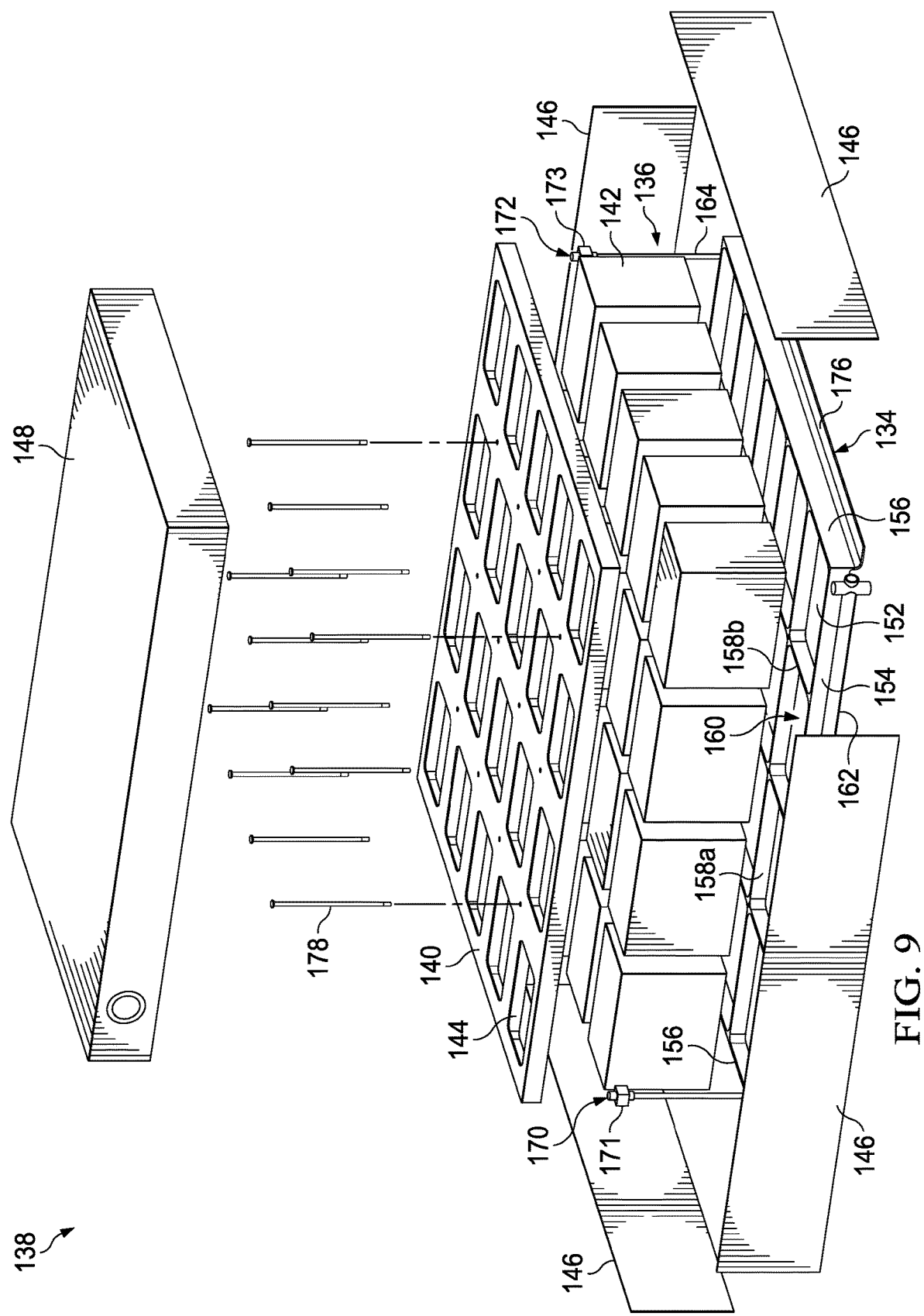
FIG. 9 is a disassembled perspective view of the battery assembly of FIG. 6.

As best shown in FIGS. 7-9, cold plate (134) of battery assembly (138) includes a generally horizontal, rectangular main structural web (152), generally vertical sidewalls (154) extending upwardly from an upper surface of main structural web (152), and generally vertical end walls (156) extending upwardly from the upper surface of main structural web (152), such that sidewalls (154) and end walls (156) are each generally perpendicular to main structural web (152). As shown, cold plate (134) further includes a plurality of stiffeners in the form of generally vertical ribs including longitudinally-extending ribs (158a) and laterally-extending ribs (158b) extending upwardly from the upper surface of main structural web (152), such that ribs (158a, 158b) are each generally perpendicular to main structural web (152). More particularly, longitudinally-extending ribs (158a) are each generally parallel to sidewalls (154) and generally perpendicular to and terminate at or near end walls (156), and laterally-extending ribs (158b) are each generally parallel to end walls (156) and generally perpendicular to and terminate at or near sidewalls (154). In the example shown, ribs (158a, 158b) are arranged in a grid pattern, such that longitudinally-extending ribs (158a) intersect each laterally-extending rib (158b) and laterally-extending ribs (158b) intersect each longitudinally-extending rib (158a). Cold plate (134) includes a plurality of bores (159) positioned at respective intersections between longitudinally-extending ribs (158a) and laterally-extending ribs (158b), the purpose of which is described below. In some versions, main structural web (152), sidewalls (154), end walls (156), and ribs (158a, 158b) may be integrally formed together as a unitary piece. In addition or alternatively, any one or more of main structural web (152), sidewalls (154), end walls (156), and ribs (158a, 158b) may be constructed of a thermally conductive material, such as metal.

In the example shown, adjacent pairs of longitudinally-extending ribs (158a) are uniformly spaced apart from each other (and laterally-outermost longitudinally-extending ribs (158a) are uniformly spaced apart from sidewalls (154)) at equal intervals, and adjacent pairs of laterally-extending ribs (158b) are uniformly spaced apart from each other (and longitudinally-outermost laterally-extending ribs (158b) are uniformly spaced apart from end walls (156)) at equal intervals to collectively define respective compartments (160) therebetween. Compartments (160) may be arranged in a grid pattern for securely receiving at least portions (e.g., bottoms) of respective battery packs (142) to assist with stabilizing battery packs (142) against movement relative to cold plate (134). In the example shown, cold plate (134) includes a total of 20 compartments (160) for securely receiving 20 battery packs (142). However, any suitable number of compartments (160) may be used to securely receive any corresponding number of battery packs (142). Thus, ribs (158a, 158b) may be configured to both provide structural rigidity to cold plate (134), and to assist with securing battery (136) to cold plate (134).

In the present version, cold plate (134) further includes fluid intake and exhaust conduits (162, 164) fixed to respective lateral sides of main structural web (152) and a plurality of laterally-extending tubes (166) extending along a lower recessed surface of main structural web (152) between conduits (162, 164), such that conduits (162, 164) and tubes (166) are on an opposite side of main structural web (152) from ribs (158a, 158b). Tubes (166) may be fixed to the lower recessed surface of main structural web (152) in any suitable manner, such as via swaging. In any event, each tube (166) defines a respective fluid channel (168) in fluid communication with interiors of both conduits (162, 164). Thus, tubes (166) may be configured to direct a cooling fluid (e.g., coolant, forced air, etc.) along the respective fluid channels (168) while preventing such cooling fluid from contacting main structural web (152) and/or ribs (158a, 158b).

In this regard, intake conduit (162) includes a fluid inlet port (170) having a fluid inlet valve (171) for supplying the cooling fluid to fluid channels (168) from a cooling fluid reservoir (not shown), and exhaust conduit (164) includes a fluid outlet port (172) having a fluid outlet valve (173) for discharging the cooling fluid from fluid channels (168) to the cooling fluid reservoir. In some versions, any of fluid channels (168) may be in fluid communication with each other, such as via conduits (162, 164). For example, alternating ends of fluid channels (168) may be in fluid communication with each other to collectively define a generally serpentine fluid path from inlet port (170) to outlet port (172). In other versions, fluid channels (168) may be isolated from each other to define independent, generally parallel fluid paths from inlet port (170) to outlet port (172). While each fluid channel (168) of the present example is defined by a respective tube (166), fluid channels (168) may be defined by any other suitable structure. For example, each fluid channel (168) may be defined between adjacent pairs of lower ribs (not shown) extending downwardly from main structural web (152).

In the present version, cold plate (134) also includes a pair of longitudinally-opposed attachment flanges (176) extending longitudinally outwardly from main structural web (152) beyond end walls (156). Cold plate (134) may be secured to lower keel beams (32) (or upper roof beams (30)) via a plurality of aerospace fasteners such as pins, screws, rivets or other suitable fastening means extending through bores (not shown) in attachment flange (176) and into lower keel beams (32) (or upper roof beams (30)) to form airframe (24), such that cold plate (134) may act as a load path for airframe (24).

Figure 6:
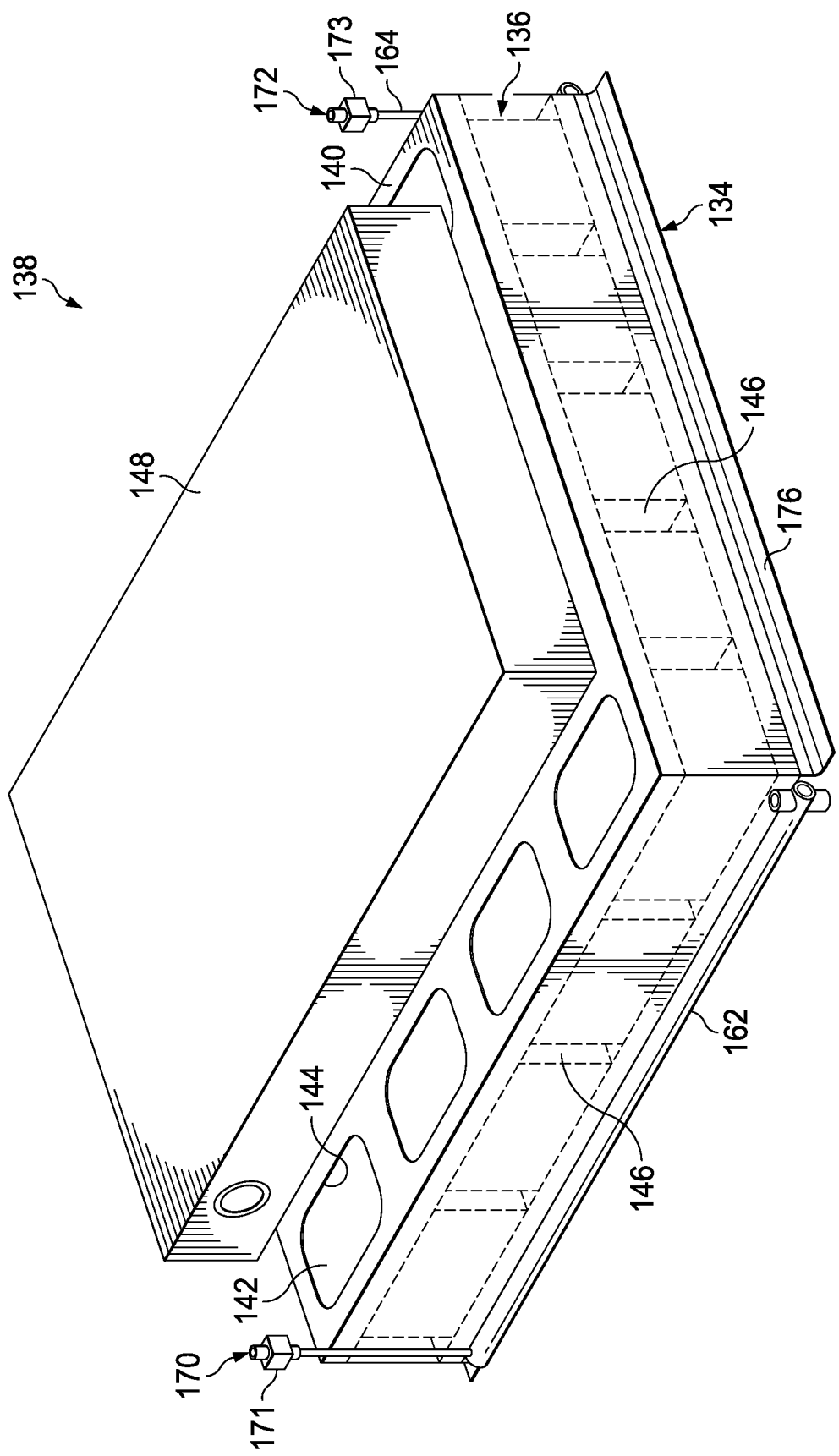
FIG. 6 is a top perspective view of another exemplary battery assembly.

As best shown in FIGS. 6 and 9, battery (136) is mounted to the upper side of cold plate (134) to form battery assembly (138). More particularly, battery (136) is mounted to ribs (158a, 158b) such that battery (136) is positioned over cold plate (34). Battery (136) may be mounted to ribs (158a, 158b) via aerospace fasteners (178) extending through battery fitting (140) and received by respective bores (159) in ribs (158a, 158b) such that battery fitting (140) clamps battery packs (142) against main structural web (152) within respective compartments (160). In any event, an outer surface of each battery pack (142) may be in contact or near contact with ribs (158a, 158b) and/or main structural web (152)), to assist with transferring heat from battery (136) to the cooling fluid within cooling channels (168), such as for cooling battery (136) either during or prior to (e.g., "preconditioning" battery (136)) performing a flight operation. While battery (136) of the present version is mounted to the upper side of cold plate (134), battery (136) may alternatively be mounted to the lower side of cold plate (134).

Figure 10:
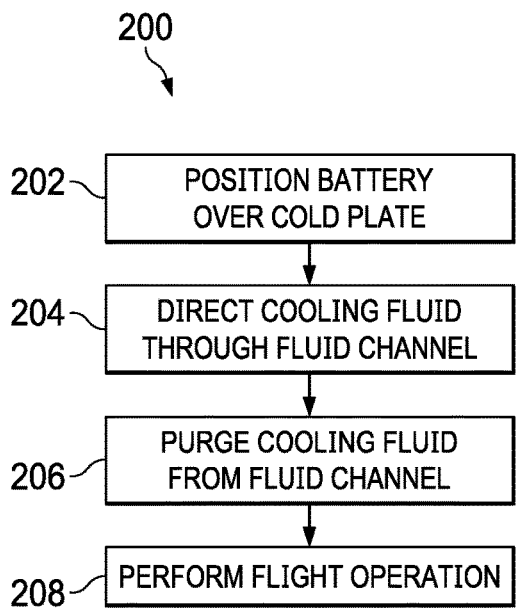
FIG. 10 is a flowchart of an exemplary method of cooling a battery on an aircraft.

Referring now to FIG. 10, a method (200) of cooling an electrical power source, such as any of batteries (36, 136), of a rotorcraft (10) begins with step (202), at which battery (36, 136) is positioned over a cold plate, such as any of cold plates (34, 134). Method (200) proceeds to step (204), at which a cooling fluid (e.g., coolant, forced air, etc.) is directed through at least one fluid channel (68, 168) of cold plate (34, 134) below battery (36, 136) to thereby transfer heat from battery (36, 136) to the cooling fluid. In the illustrated version, method (200) then proceeds to step (206), at which the cooling fluid is purged from fluid channel (68, 168) of cold plate (34, 134), and further proceeds to step (208), at which a flight operation is performed while fluid channel (68, 168) of cold plate (34, 134) is empty (e.g., with the cooling fluid purged therefrom). In other versions, step (206) may be omitted, such that at step (208) a flight operation is performed while the cooling fluid remains within the at least one fluid channel (68, 168) of cold plate (34, 134).

Figure 11:
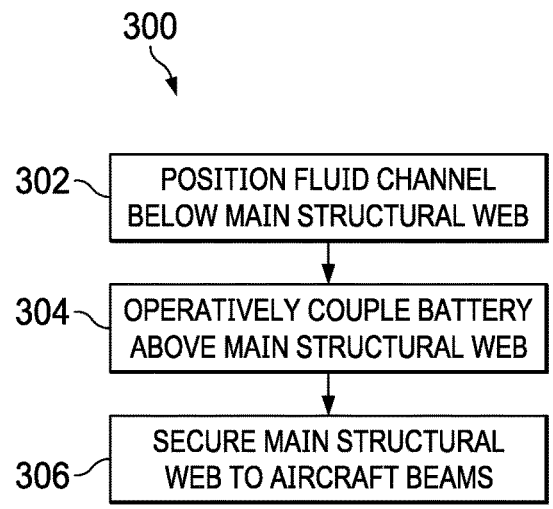
FIG. 11 is a flowchart of an exemplary method of manufacturing a battery assembly.

Referring now to FIG. 11, a method (300) of manufacturing a battery assembly, such as any of battery assemblies (38, 138), begins with step (302), at which at least one fluid channel, such as any of fluid channels (68, 168), is positioned below a main structural web, such as any of main structural webs (52, 152). Method (300) then proceeds to step (304), at which a battery, such as any of batteries (36, 136), is operatively coupled to main structural web (52, 152) (e.g., either directly or via ribs (58a, 58b, 158a, 158b)) above fluid channel (68, 168). In the illustrated version, method (300) proceeds to step (306), at which main structural web (52, 152) is secured to a pair of beams of rotorcraft (10), such as upper roof beams (30) or lower keel beams (32). In some versions, step (306) may be performed during or prior to any of steps (302, 304).

Figure 12:
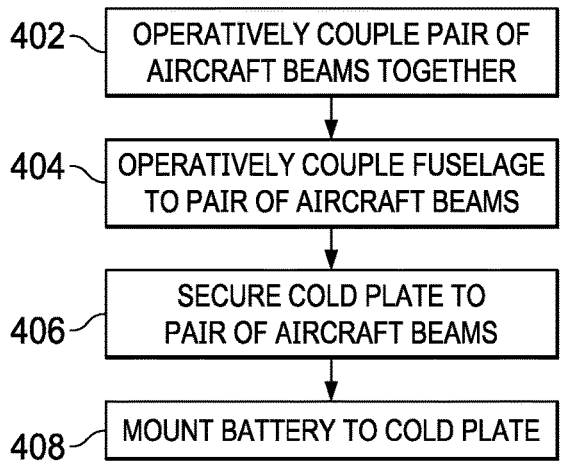
FIG. 12 is a flowchart of an exemplary method of manufacturing an aircraft.

Referring now to FIG. 12, a method (400) of manufacturing an aircraft, such as rotorcraft (10), begins with step (402), at which a pair of beams, such as upper roof beams (30) or lower keel beams (32), are operatively coupled to each other to at least partially form an airframe, such as airframe (24). Method (400) then proceeds to step (404), at which a fuselage, such as fuselage (16), is operatively coupled to airframe (24) such that fuselage (16) is supported by airframe (24). Method (400) then proceeds to step (406), at which a battery chassis in the form of a cold plate, such as any of cold plates (34, 134), is secured to the pair of beams (30, 32). In some versions, step (406) may be performed during or prior to step (404). In the illustrated version, method (400) proceeds to step (408), at which a battery, such as any of batteries (36, 136), is mounted to cold plate (34, 134). In some versions, step (408) may be performed during or prior to any of steps (402, 404, 406).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An aircraft comprising:
   (a) a fuselage;
   (b) an airframe supporting the fuselage, wherein the airframe includes a pair of longitudinally-extending beams; and
   (c) a pair of adjacent battery assemblies, each battery assembly of the pair of adjacent battery assemblies including:
      (i) a cold plate secured to the pair of longitudinally-extending beams such that the cold plate is configured to act as a load path for the airframe, the cold plate including an attachment flange, and
      (ii) a battery mounted to the cold plate,
   wherein the respective cold plates of the pair of adjacent battery assemblies are secured to each other via the respective attachment flanges.

2. The aircraft of claim 1, wherein the cold plate includes:
   (a) a planar member; and
   (b) at least one fluid channel positioned below a lower side of the planar member and configured to receive a cooling fluid,
   wherein the battery is mounted to an upper side of the planar member for transferring heat from the battery to the cooling fluid through the planar member.

3. The aircraft of claim 2, wherein the planar member includes a main structural web.

4. The aircraft of claim 2, wherein the cold plate further includes a plurality of stiffeners positioned on the upper side of the planar member.

5. The aircraft of claim 4, wherein the plurality of stiffeners are spaced apart from each other to define respective compartments for receiving corresponding battery packs of the battery.

6. The aircraft of claim 2, wherein the at least one fluid channel is defined by a tube extending along a lower recessed surface of the planar member.

7. The aircraft of claim 2, wherein the cold plate further includes an enclosure panel operatively coupled to the planar member.

8. The aircraft of claim 7, wherein the enclosure panel is positioned below the at least one fluid channel.

9. The aircraft of claim 8, wherein the enclosure panel defines an outer structural skin of the aircraft.

10. The aircraft of claim 1, wherein the battery includes a fitting having a plurality of apertures arranged in a grid pattern and configured to receive corresponding battery packs.

11. The aircraft of claim 10, wherein the fitting is configured to clamp the battery packs against the cold plate.

12. The aircraft of claim 1, wherein the attachment flange is configured to couple to the pair of longitudinally-extending beams.

13. The aircraft of claim 1, wherein the battery has a battery weight, wherein the cold plate is configured to support the battery weight.

14. The aircraft of claim 1, wherein the pair of longitudinally-extending beams includes a pair of upper roof beams.

15. The aircraft of claim 1, wherein the pair of longitudinally-extending beams includes a pair of lower keel beams.

16. A method of manufacturing a battery assembly for an aircraft, the method comprising:
   (a) positioning at least one tube defining at least one fluid channel below a main structural web of a first cold plate of a first battery assembly;

(b) operatively coupling a battery to the main structural web such that the battery is positioned above the at least one fluid channel and such that the battery is spaced apart from the at least one tube by the main structural web;

(c) securing the main structural web to a pair of beams of the aircraft such that the battery remains above the at least one fluid channel; and (d) securing the first cold plate to a second cold plate of a second battery assembly adjacent to the first battery assembly, via a first attachment flange of the first cold plate and a second attachment flange of the second cold plate.

17. An aircraft comprising:

(a) a fuselage;

(b) an airframe supporting the fuselage, wherein the airframe includes a pair of longitudinally-extending beams; and (c) at least one battery assembly, each of the at least one battery assembly (c) including:

(i) a cold plate comprising:
  (A) a main structural web,
  (B) a plurality of stiffeners positioned on an upper side of the main structural web,
  (C) at least one attachment flange coupled to the pair of longitudinally-extending beams, and
(ii) a battery mounted to the cold plate, wherein the battery has a weight and is configured to apply a bending load to the cold plate, wherein the cold plate is configured to transfer at least a portion of the bending load through the plurality of stiffeners, the main structural web, and the at least one attachment flange to the pair of longitudinally-extending beams, wherein the at least one battery assembly includes a pair of adjacent battery assemblies, wherein the respective cold plates of the pair of adjacent battery assemblies are secured to each other via the respective attachment flanges.

18. The aircraft of claim 17, wherein the cold plate is further configured to react shear loads.

* * * * *